(12) United States Patent
Olofsson

(10) Patent No.: US 6,595,183 B1
(45) Date of Patent: Jul. 22, 2003

(54) INTERNAL COMBUSTION ENGINE

(75) Inventor: Eric Olofsson, Ronninge (SE)

(73) Assignee: SAAB Automobile AB (SE)

( * ) Notice: Subject to any disclaimer, the term of this patent is extended or adjusted under 35 U.S.C. 154(b) by 0 days.

(21) Appl. No.: 10/088,378

(22) PCT Filed: Sep. 13, 2000

(86) PCT No.: PCT/SE00/01765

§ 371 (c)(1),
(2), (4) Date: Mar. 15, 2002

(87) PCT Pub. No.: WO01/20136

PCT Pub. Date: Mar. 22, 2001

(30) Foreign Application Priority Data

Sep. 15, 1999 (SE) .............................................. 9903282

(51) Int. Cl.⁷ ................................................ F02B 37/00
(52) U.S. Cl. .................. 123/315; 123/90.15; 123/559.2
(58) Field of Search .............................. 123/315, 90.15, 123/559.2

(56) References Cited

U.S. PATENT DOCUMENTS

| | | | | |
|---|---|---|---|---|
| 4,651,684 A | * | 3/1987 | Masuda et al. | .......... 123/90.16 |
| 4,779,589 A | * | 10/1988 | Matsuura et al. | ............ 123/315 |
| 4,875,455 A | * | 10/1989 | Hashimoto et al. | ......... 123/315 |
| 4,964,375 A | * | 10/1990 | Takeyama et al. | .......... 123/315 |
| 5,372,108 A | * | 12/1994 | Wu | .............................. 123/311 |
| 5,443,050 A | | 8/1995 | Hitomi et al. | ............... 123/492 |
| 5,826,560 A | * | 10/1998 | Ito | ............................... 123/315 |
| 5,937,807 A | | 8/1999 | Peters | .......................... 123/90 |

FOREIGN PATENT DOCUMENTS

| | | | | |
|---|---|---|---|---|
| EP | 0275245 | 7/1988 | | |
| GB | 2185286 | 7/1987 | | ..................... 41/10 |

OTHER PUBLICATIONS

European Search Report PCT/SE00/01765 dated Dec. 20, 2000.

* cited by examiner

*Primary Examiner*—Erick Solis
(74) *Attorney, Agent, or Firm*—Ostrolenk, Faber, Gerb & Soffen, LLP

(57) ABSTRACT

A multicylinder internal combustion engine with an exhaust-driven turbocompressor and with a divided exhaust flow has at least two exhaust valves and one intake valve per cylinder. A first exhaust valve is connected to a first exhaust manifold which leads to the turbine of the compressor, while a second exhaust valve is connected to a second exhaust manifold which opens downstream of the turbine. In the top dead center position of the piston, the second exhaust valve and the intake valve are open at the same time for a period. The synchronization between these valves is such that the length of the period during which they are open together increases with the engine speed when the engine is driven at high load. In this way, the possibilities are improved of the engine providing good torque over a wide engine speed range.

14 Claims, 3 Drawing Sheets

INTERNAL COMBUSTION ENGINE

TECHNICAL FIELD

The invention relates to an internal combustion engine, particularly a supercharged engine, with a divided exhaust flow and particularly relates to control over the operation of the intake and exhaust valves to the cylinders.

STATE OF THE ART

The use of turbocharged engines, that is to say engines in which supercharging is carried out by means of a compressor which is driven by an exhaust-driven turbine, is becoming increasingly common within automotive technology. At high power, a greater charge can as a result be utilized than in a conventional engine. At full throttle, however, poor volumetric efficiency is obtained as a consequence of a negative pressure difference between the inlet and the outlet during the period in which inlet valves and exhaust valves are open at the same time. This means that it is not possible to empty the cylinder completely during the exhaust stroke, as a result of which the desired quantity of new air cannot be supplied to the cylinder either. Another consequence is that the exhaust flow at low engine speed is insufficient to drive the turbine effectively, with the result that the charging pressure is not optimal.

By utilizing the known principle of the divided exhaust period according to patent specification GB 2 185 286, the operation of the exhaust turbine can be improved by virtue of the fact that the exhaust flow is divided up so that only the high-pressure flow goes to the exhaust turbine while the low-pressure flow is conducted past the exhaust turbine. This is achieved by virtue of the fact that there are at least two exhaust valves in each cylinder, which open differently and feed separate exhaust manifolds. In this way, better emptying of the cylinder is made possible.

During the exhaust stroke of the piston, the intake valve opens before the piston has reached its top dead centre position, at the same time as the second exhaust valve (the last opened) is still open and is on the point of being closed after the piston has passed its top dead centre position. There is therefore a valve overlap around the top dead centre position of the piston, in which one exhaust valve and one intake valve are open at the same time, and in which the pressure in the exhaust system is low. If this valve overlap is too great, a large part of the air fed in by the compressor can at full throttle "leak out" via the open exhaust valve and will therefore not be burned in the cylinder. The result is an imbalance in the mass flow between the compressor and the turbine, which results in the turbine not being capable of making the compressor deliver sufficient charging pressure. This in turn results in the torque being impaired. On the other hand, if the valve overlap is too small, residual gases will remain in the cylinder, with the result that the quantity of combustion air is reduced with the attendant reduction in power.

THE OBJECT OF THE INVENTION

The aim of the invention is to produce a turbo-engine which has improved characteristics within a greater engine speed range at full load.

BRIEF DESCRIPTION OF THE INVENTION

The aim of the invention is achieved by producing an internal combustion engine as indicated above wherein the valve open condition overlap around the top dead center position of the piston is adjusted by valve operation controlling or timing elements to synchronize the operation of those valves so that the length of the open condition overlap increases with engine speed when the engine is driven at high load and particularly causes the intake valve to open increasingly early before the top dead center position of the piston while one of the exhaust valves closes increasingly late after the top dead center position of the piston.

By means of the chosen embodiment, it is possible to control the gas flow through the engine so that exhaust gases are allowed out without an unnecessarily great quantity of air fed in being able to "leak out" via an exhaust valve which is still open. This leads to more effective filling of the cylinder and as a result an increased mass flow of exhaust gases, which in turn increases the possibility of increasing the torque at low engine speed by means of a higher charging pressure.

The synchronization between the valves can advantageously be such that, as the engine speed increases, the intake valve opens increasingly early before the top dead centre position of the piston while the second exhaust valve closes increasingly late after the top dead centre position of the piston. In this way, the position of maximum opening can be reached when the piston is at or very close to the top dead centre position.

The relationship between the engine speed and the length of the overlap period can suitably be exponential.

Further features and advantages of the solution according to the invention emerge from the description and the other patent claims.

The invention will be described in greater detail below with reference to exemplary embodiments shown in the drawing.

DESCRIPTION OF EXEMPLARY EMBODIMENTS

Figure 1:
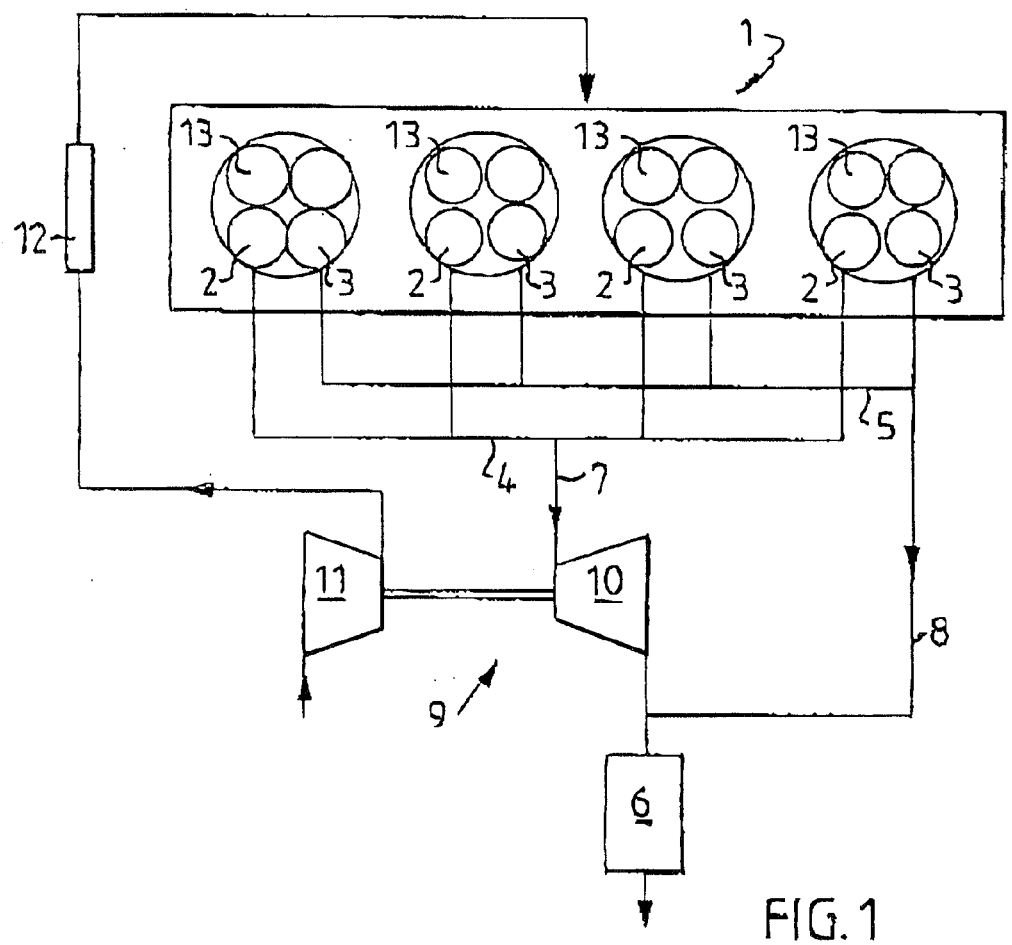
FIG. 1 shows an internal combustion engine according to the invention.

FIG. 1 shows diagrammatically a multicylinder internal combustion engine 1 according to the invention embodied as an Otto engine. The cylinders of the engine each have at least two exhaust valves 2 and 3. Exhaust is conducted out from the first exhaust valves 2 of the cylinders to a first exhaust manifold 4 common to the cylinders. Exhaust is conducted out from the second exhaust valves 3 of the cylinders to a second exhaust manifold 5 common to the cylinders. The first exhaust manifold 4 is connected to a catalyst 6 via a first exhaust line 7, and the second exhaust manifold 5 is connected to the catalyst 6 via a second exhaust line 8. One or more silencers (not shown) is or are located downstream of the catalyst 6 in a conventional manner.

The engine 1 is also equipped for supercharging by means of an exhaust-driven turbocompressor 9 (or turbocharger), the turbine 10 of which is connected in the first exhaust line 7 and is therefore fed from the first exhaust manifold 4 and the first exhaust valves 2. A compressor 11 driven by the turbine 10 supplies the engine with charging air which, if appropriate, is cooled in a cooler 12. This charging air is fed into each cylinder in a conventional manner via one or more intake valves 13 (not shown in detail).

Figure 2:
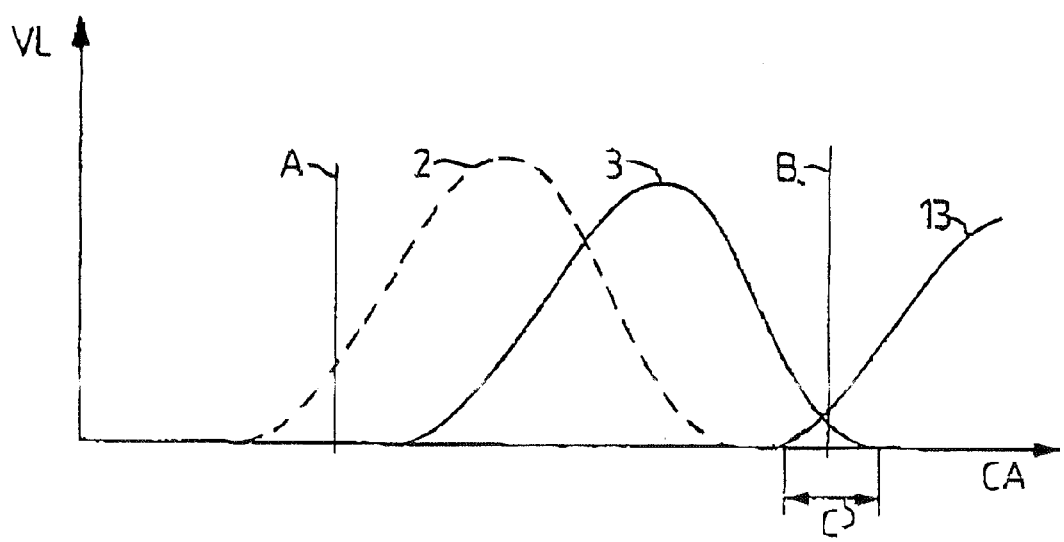
FIG. 2 shows valve lift as a function of crankshaft angle for different valves.

The engine 1 described here therefore has a divided exhaust flow according to the principle described in the patent specification mentioned, GB 2 155 286. Interaction between exhaust valves and intake values in a cylinder is shown in diagrammatic form in FIG. 2. The horizontal axis represents the crankshaft angle CA of the engine, while the vertical axis represents the value of the valve lift VL. During the exhaust stroke of the piston, between the bottom dead centre position A and the top dead centre position B of the piston, both the exhaust valves 2 and 3 are essentially open. As can be seen, the first exhaust valve 2 opens before the piston has reached its bottom dead centre position A and closes before the piston has reached its top dead centre position B. On the other hand, the second exhaust valve 3 does not open until the piston is already a little way up from its bottom dead centre position A and remains open for a period after the piston has passed its top dead centre position B. As can be seen, the intake valve 13 opens before the piston has reached its top dead centre position B, while the second exhaust valve 3 is still open. In this way, the second exhaust valve 3 and the intake valve 13 will be open at the same time for a certain overlap period C.

This overlap period usually remains constant in an engine under different operating conditions as a consequence of the fact that the valves always open and close at the same position of the crankshaft and the piston. According to the invention, however, it is possible to change the duration of the overlap period C as a function of the working conditions of the engine. This is shown in greater detail in FIGS. 3 and 4.

Figure 3:
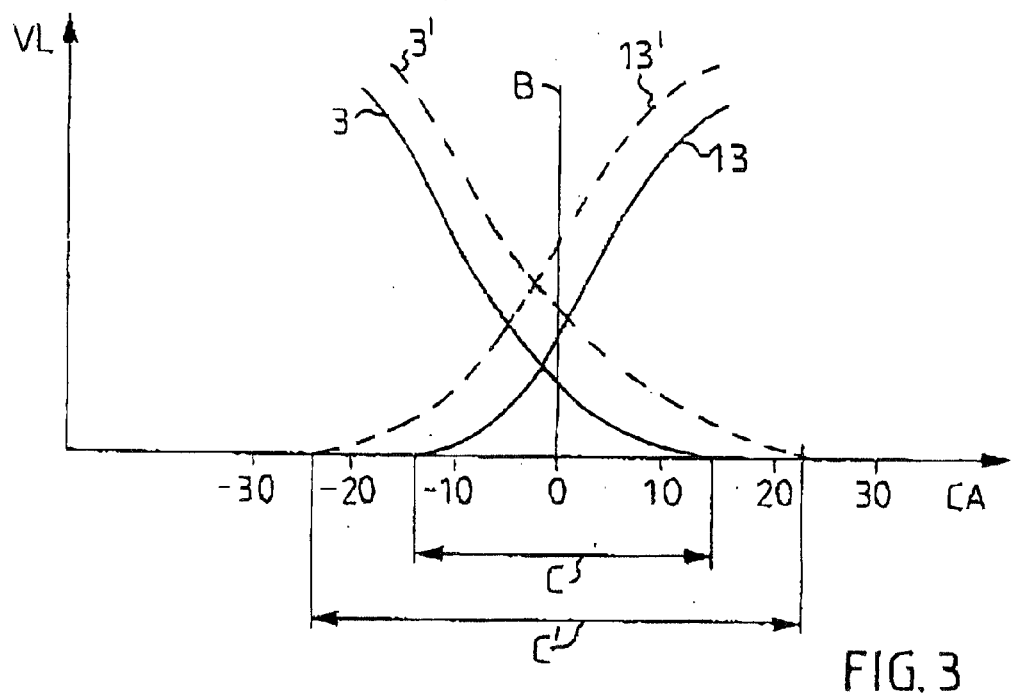
FIG. 3 shows a part of FIG. 2, showing valve overlap.

FIG. 3 shows in greater detail how the valve lift is changed for the second exhaust valve 3 and the intake valve 13 around the top dead centre position B of the piston. The curves drawn in solid lines represent an operating situation with full throttle and an engine speed of roughly 2000 rpm. The overlap period C is in this case roughly 30°. The curves 3' and 13' drawn in broken lines also represent an operating situation with full throttle but now with double the engine speed, roughly 4000 rpm. The overlap period C' is now considerably greater, roughly 42°. In the example shown here, the curves are essentially symmetrical about the top dead centre position B of the piston, but other curve shapes are of course also possible, depending on the characteristics of the engine in question.

Figure 4:
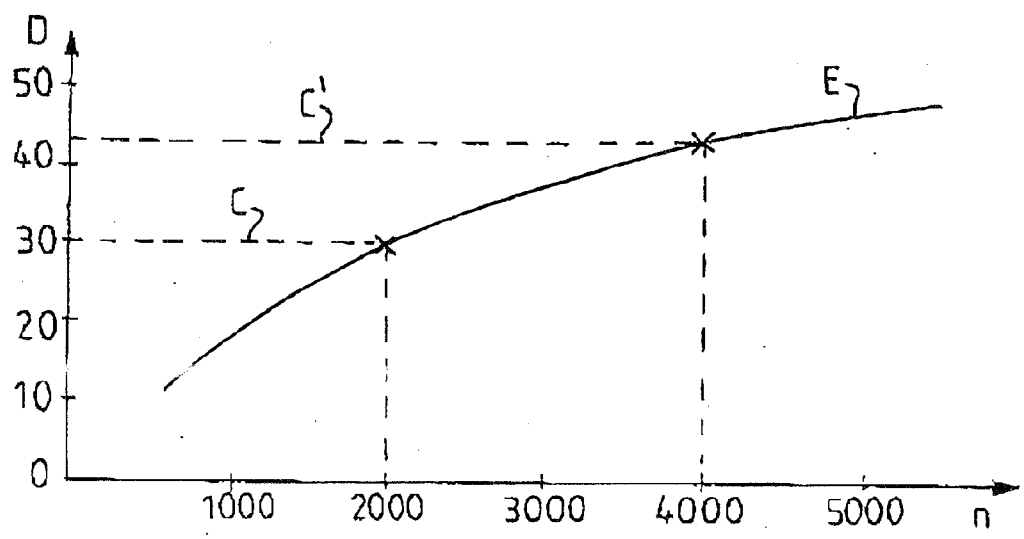
FIG. 4 shows valve overlap as a function of engine speed, FIG. 5 schematically illustrates piston operation, and FIG. 6 schematically illustrates the control of the valves of an individual cylinder.
Figure 6:
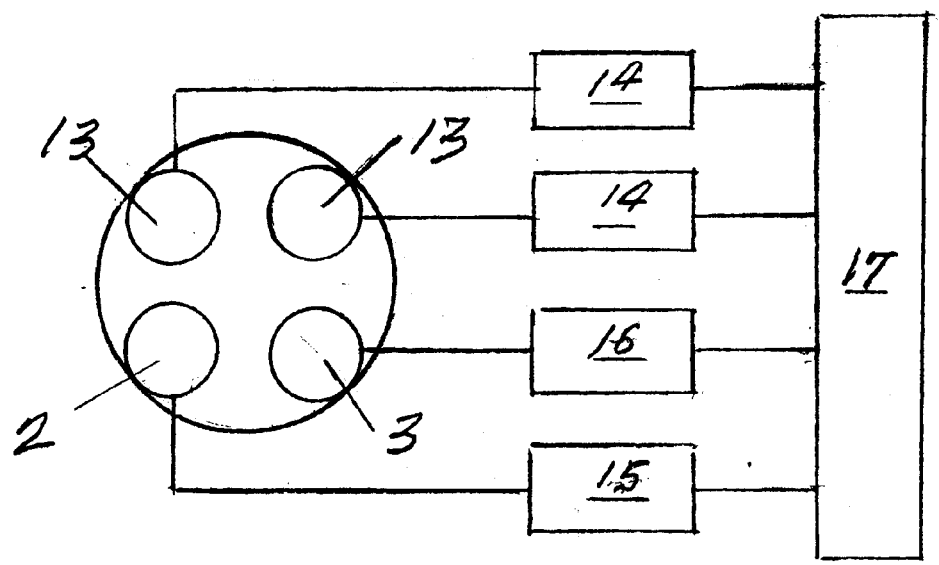
Figure 5:
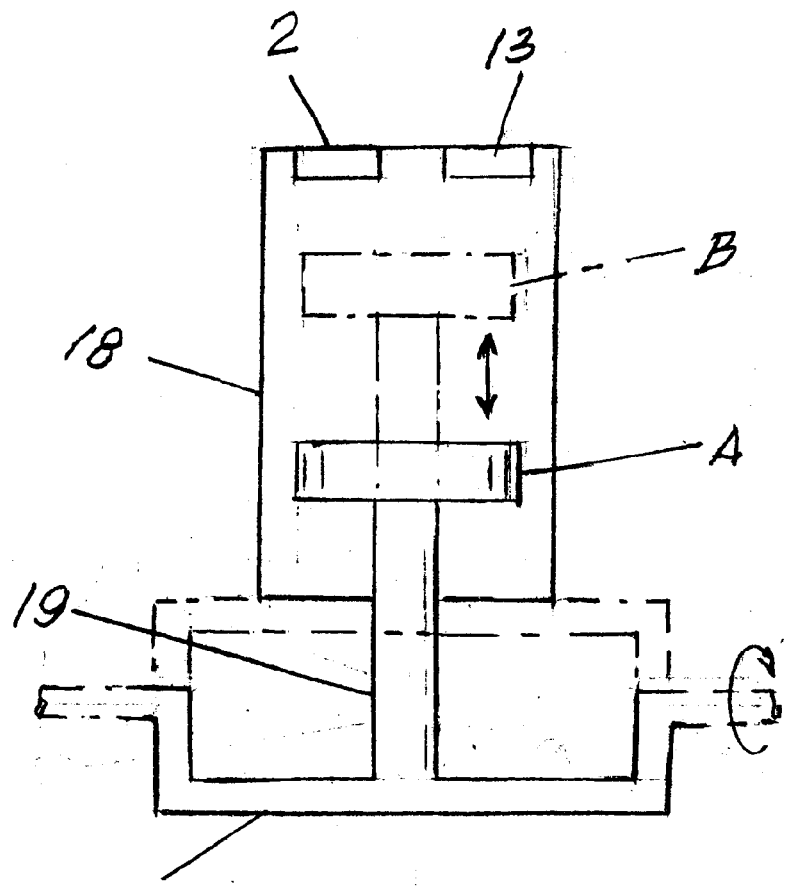

The relationship between the value of the engine speed n (rpm) and the duration of the overlap period D is shown in greater detail by a curve E in FIG. 4. As can be seen, the relationship is not linear but exponential. The result of a doubling of the engine speed is not that the duration of the overlap period doubles, but that it increases by roughly the square root of the engine speed ratio, that is to say by roughly 41%.

The values indicated above for the overlap period and the engine speed have been drawn in.

The relationship between the engine speed and the duration of the valve overlap period D has been selected here in such a manner that as great a torque as possible will be obtained at full throttle within a given engine speed range. This means that the duration of the valve overlap period D is just right at each specific engine speed. Too short a valve overlap period results in residual gases remaining in the cylinder, which leads to worse cylinder filling and thus loss of power. If, on the other hand, the valve overlap period is made too long, too much of the air fed in via the compressor is able to leak out via the open exhaust valve and can therefore not be used for combustion in the cylinder, resulting in a loss of power in this case also. In this latter case, not all the air supplied by the compressor is caught in the cylinder. Another way of expressing this is that the inlet pressure is too low to provide full torque at the engine speed in question.

The valves can be controlled in a number of different ways, for example by means of continuously variable cam adjustment for both the inlet and the exhaust camshaft. A number of other methods are also possible, however, such as for example the use of electrohydraulic valves which can be given variable characteristics as required and desired.

Conventional disc valves require a relatively long time to open and close as a displacement in their axial direction is necessary and cannot be effected too forcefully. Valves which are operated in a different manner would therefore be capable of affording increased precision in the gas exchange in a cylinder by opening and closing more rapidly.

Within the scope of the invention, the relationship between the engine speed and the duration of the overlap period can of course be different to that indicated above. For example, the value of the exponent in the relationship function can be selected differently.

According to the invention, the aim is therefore to empty the cylinder as completely as possible of residual gases without allowing an unnecessary throughflow of air. As the position of the throttle can be adjusted rapidly via a driver action, it is desirable that the valve control is designed in such a manner that a change in the duration of the overlap period can take place essentially as rapidly as the change in the position of the throttle.

What is claimed is:

1. An internal combustion engine including
   a plurality of cylinders, a respective piston in each of the cylinders; and each piston moveable between a bottom dead center position maximizing the volume in the cylinder and a top dead center position minimizing the volume in the cylinder;
   an intake valve into each cylinder enabling entrance of air into the cylinder; at least two exhaust valves from each cylinder, wherein the valves are connected with the cylinder for respectively permitting intake and exhaust of air and gasses from the cylinder as the piston moves between the bottom and the top dead center positions in the respective cylinder;
   a first exhaust manifold, and each of the first exhaust valves of each cylinder being connected to the first exhaust manifold;
   a turbocompressor communicating with the cylinders for supercharging the engine; an exhaust driven turbine in the turbocompressor, the turbine having an inlet connected to the first exhaust manifold for operating the turbocompressor for supercharging the engine;
   a second exhaust manifold, and each of the second exhaust valves of each cylinder being connected to the second exhaust manifold;
   an engine exhaust system to which the first and the second exhaust manifolds are connected for receiving exhaust gasses;

the first exhaust manifold being connected to the turbine and the turbine being connected to the exhaust system, and the second exhaust manifold is connected to the exhaust system downstream in the exhaust system from the exhaust driven turbine;

valve control elements at the valves for the cylinders selectively operating the valves to open and close and the control elements are operable so that the intake valve and the second exhaust valve are open for a selected overlapping time period around the piston's top dead center position and operable for synchronizing the intake valve and the second exhaust valve to adjust the overlapping period during which the valves are both open around the top dead center position of the piston to increase the time period as the engine speed increases and when the engine is driven at high load.

2. The internal combustion engine of claim 1, wherein the control elements synchronize the intake valve and the second exhaust valve such that as the engine speed increases, the intake valve is opened increasingly before the top dead center position of the piston while the second exhaust valve closes increasingly late after the top dead center position of the piston.

3. The internal combustion engine of claim 2, further comprising a rotatable crank shaft rotatable at the engine and connected with the valves for driving the intake and exhaust valve to selectively open and close; the control elements controlling the period of time during which the intake valve and the second exhaust valve are open at the same time to be approximately 30 crank shaft degrees of the crank shaft at an engine speed of approximately 2000 rpm.

4. The internal combustion engine of claim 2, wherein the control elements synchronize the operation of the intake and second exhaust valves such that a selected increase in engine speed from a first lower speed to a second higher speed adjusts the length of the period during which the intake valve and the second exhaust valves are open overlappingly to increase exponentially according to a ratio between the higher engine speed and the lower engine speed.

5. The internal combustion engine of claim 4, wherein the value of the exponent of the increase in the time is approximately one half.

6. The internal combustion engine of claim 4, wherein the control elements are operable so that the intake valve and the second exhaust valve are open together for a period of time generally symmetrical about the top dead center position of the piston.

7. The internal combustion engine of claim 2, wherein the control elements are operable so that the intake valve and the second exhaust valve are open together for a period of time generally symmetrical about the top dead center position of the piston.

8. A method of controlling operation of respective valves of cylinders of an internal combustion engine for turbo charging the internal combustion engine, wherein the engine includes a plurality of engine cylinders, each cylinder contains a piston moveable between a bottom dead center position in the cylinder for maximum volume in the cylinder and a top dead center position in the cylinder for minimal volume in the cylinder, an intake valve to the cylinder and a first and a second exhaust valve from the cylinder, a first exhaust manifold communicating with the first exhaust valves and communicating with an exhaust driven turbine of a turbo compressor for supercharging the engine, and a second exhaust manifold communicating with the second exhaust valves and communicating with an exhaust system of the engine after the turbo compressor;

the method comprising:
opening the intake valve and the second exhaust valve for each cylinder at an overlapping time period around when the piston is in its top dead center position; and synchronizing the opening and closing of the intake valve and the second exhaust valve so that the length of the period of time during which they are both opened around the top dead center position increases with engine speed when the engine is driven at high load.

9. The method of claim 8, further comprising synchronizing the operation of the intake valve and the second exhaust valve so that the intake valve opens increasingly early before the top dead center position of the piston and the second exhaust valve closes increasingly late after the top dead center position of the piston.

10. The internal combustion engine of claim 9, wherein a crank shaft of the engine is rotatable for operating the intake and exhaust valves;

the method further comprising:
synchronizing the operation of the intake and the second exhaust valves such that the length of the period of time during which the intake valve and the second exhaust valve are open at the same time is approximately 30 crank shaft degrees of the crank shaft at an engine speed of approximately 2000 rpm.

11. The method of claim 9, wherein the operations of the intake valve and the second exhaust valve are synchronized so that upon an increase of engine speed from a first lower speed to a second higher speed, the length of the time period during which the intake valve and the second exhaust valve are open at the time increases exponentially with the ratio between the higher engine speed and the lower engine speed.

12. The method of claim 11, wherein the value of the exponent is about one half.

13. The method of claim 11, wherein the operations of the intake valve and the second exhaust valve are synchronized so that the intake valve and the second exhaust valve are open together for a period of time generally symmetrical about the top dead center position of the piston.

14. The method of claim 9, wherein the operations of the intake valve and the second exhaust valve are synchronized so that the intake valve and the second exhaust valve are open together for a period of time generally symmetrical about the top dead center position of the piston.

* * * * *